(12) United States Patent
Snellenberg et al.

(10) Patent No.: US 9,649,920 B2
(45) Date of Patent: May 16, 2017

(54) ROOF ASSEMBLY FOR A VEHICLE

(71) Applicant: Inalfa Roof Systems Group B.V., Oostrum (NL)

(72) Inventors: Ronny Marinus Jacobus Snellenberg, Helmond (NL); Etienne Philippe Marcel André Coiffard, Kleve (DE); Marcel Johan Christiaan Nellen, Merselo (NL); Ruud Geurts, Helden (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/136,648

(22) Filed: Apr. 22, 2016

(65) Prior Publication Data

US 2016/0236557 A1 Aug. 18, 2016

Related U.S. Application Data

(63) Continuation of application No. 14/335,993, filed on Jul. 21, 2014, now Pat. No. 9,321,335.

(30) Foreign Application Priority Data

Jul. 23, 2013 (EP) .................................... 13177541

(51) Int. Cl.
*B60J 7/19* (2006.01)
*B60J 7/16* (2006.01)

(52) U.S. Cl.
CPC ............. *B60J 7/192* (2013.01); *B60J 7/1642* (2013.01)

(58) Field of Classification Search
CPC . B60J 7/192; B60J 7/047; B60J 7/1853; B60J 7/19

(Continued)

(56) References Cited

U.S. PATENT DOCUMENTS 8,177,294 B2 * 5/2012 Bergmiller ............... B60J 10/82
296/216.06
2012/0139287 A1 6/2012 Kitayama et al.
2013/0088051 A1 4/2013 Gruss et al.

FOREIGN PATENT DOCUMENTS

DE 29703603 * 8/1998
DE 2006060019 * 1/2009
(Continued)

OTHER PUBLICATIONS

European Search Report dated Dec. 9, 2013 for corresponding European Application No. 13177541.

(Continued)

*Primary Examiner* — Dennis H Pedder
(74) *Attorney, Agent, or Firm* — Steven M. Koehler; Westman, Champlin & Koehler, P.A.

(57) ABSTRACT

A roof assembly for a vehicle comprises a stationary part for attaching the roof assembly to the vehicle's fixed roof. At least one closing element is movably supported by the stationary part and is capable of moving between a closed position within the roof opening and an open position in which the rear of the closing element is raised and the closing element is moved rearwardly. The closing element is provided with at least a retaining hook configured to hook behind a locking device on the stationary part in the closed position of the closing element to provide a mechanical lock for the closing element in upward direction.
The locking device is movable between a locking position and an unlocking position. The closing element is configured to actuate the locking device to move from the unlocked to the locked position when the closing element is moved to the closed position.

8 Claims, 14 Drawing Sheets

(58) Field of Classification Search
USPC .................................................. 296/224, 121
See application file for complete search history.

(56) References Cited

FOREIGN PATENT DOCUMENTS

| | | |
|---|---|---|
| EP | 0371523 A1 | 6/1990 |
| EP | 1741588 A1 | 1/2010 |
| FR | 2756226 A1 | 5/1998 |
| FR | 2940934 A1 | 7/2010 |
| GB | 2285956 A | 8/1995 |

OTHER PUBLICATIONS

Final Office Action mailed Aug. 10, 2015, U.S. Appl. No. 14/335,993, filed Jul. 21, 2014.
Office Action mailed Apr. 2, 2015, U.S. Appl. No. 14/335,993, filed Jul. 21, 2014.

* cited by examiner

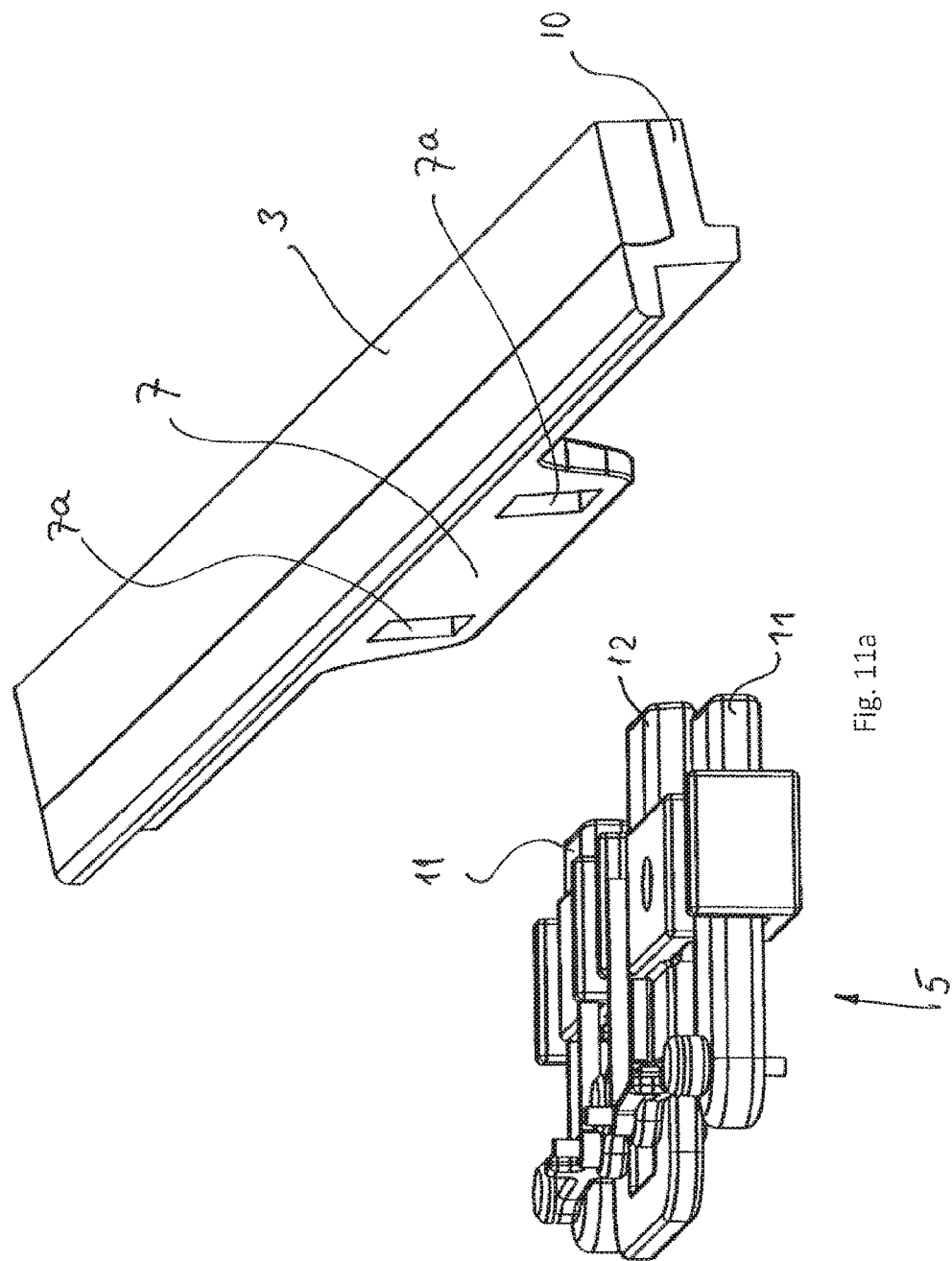

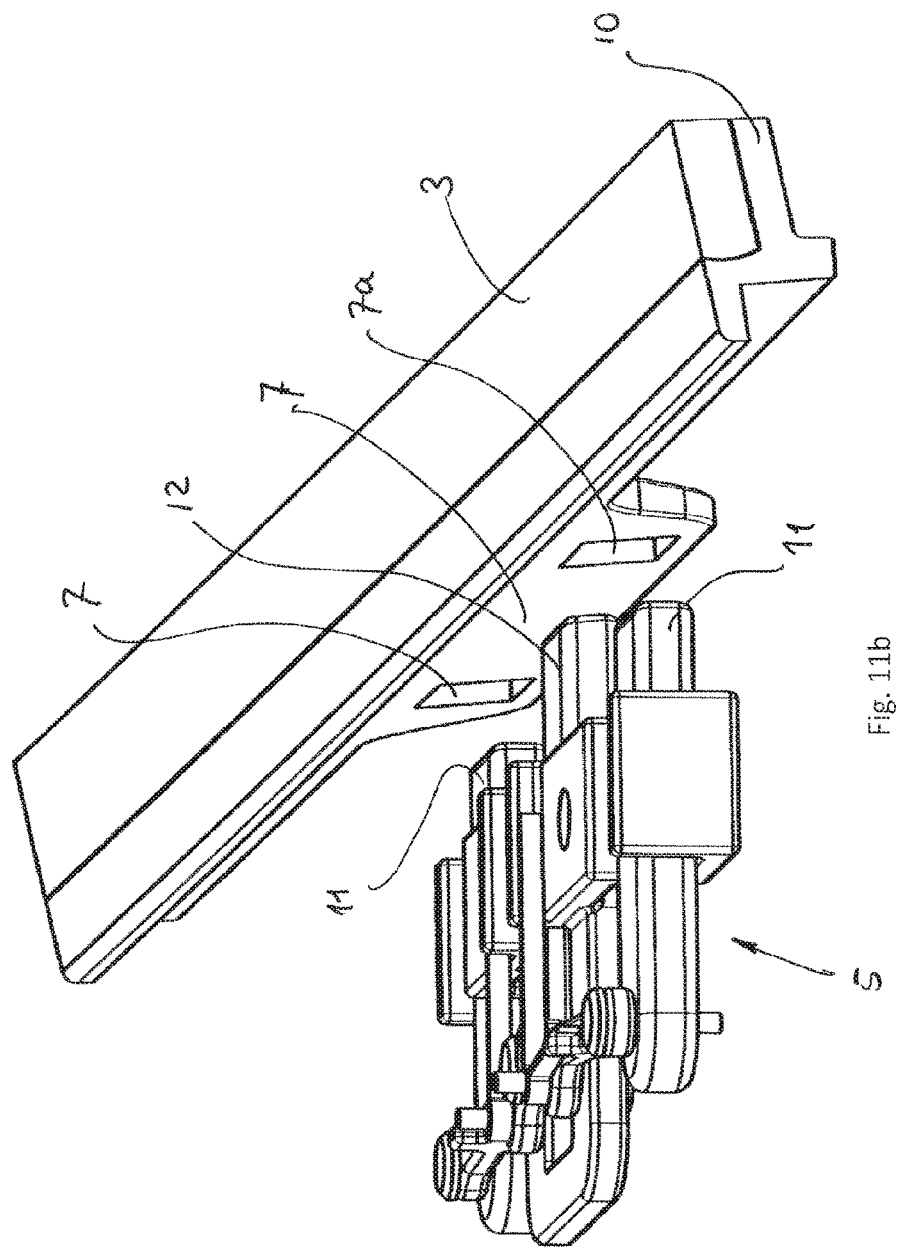

ROOF ASSEMBLY FOR A VEHICLE

CROSS REFERENCE TO RELATED APPLICATION

This application is a continuation and claims priority under 35 U.S.C. 120 to U.S. patent application Ser. No. 14/335,993, filed Jul. 21, 2014, the content of which is also incorporated herein by reference in its entirety.

BACKGROUND

The discussion below is merely provided for general background information and is not intended to be used as an aid in determining the scope of the claimed subject matter.

Aspects of the invention relate to a roof assembly for a vehicle having a roof opening in a fixed roof portion, comprising: a stationary part for attaching the roof assembly to the fixed roof portion, at least one closing element movably supported by the stationary part and being capable of moving between a closed position to close the roof opening and an open position in which the rear of the closing element is raised and the closing element is moved rearwardly, the closing element being provided with at least a retaining hook configured to hook behind a locking device on the stationary part in the closed position of the closing element to provide a mechanical lock for the closing element in upward direction.

Such roof assembly for a vehicle is known. The closing element thereof has a retaining hook that engages below a fixed part of either the fixed roof portion or the stationary part of the roof assembly, which thus operates as the locking device. Although this structure is very simple, it is not suited for all closing elements. Some closing elements move towards the closed position within the roof opening with little forward movement, so that it is not possible to reliably engage below the fixed part.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

According to one aspect of the invention, the locking device is movable between a locking position and an unlocking position, the closing element being configured to actuate the locking device to move from the unlocked to the locked position when the closing element is moved to the closed position.

By providing a locking element that can be actuated such that it moves with respect to the closing element, instead of the other way around, the movement of the closing element is not decisive for obtaining a reliable lock against a vertical movement of the closing element in its closed position. Any movement of the closing element can be used to actuate the locking device. The locking device according to the invention can be used both at the front and at the rear of the roof opening, as also a purely downward movement can be used to actuate or activate the locking device.

If the retaining hook is positioned at the front of the closing element, and the locking device is positioned at the front of the roof opening, the closing element may be provided with an operating mechanism to move it between open and closed positions, the operating mechanism being configured to move the closing element to the closed position with a downward and slightly forward movement. In that case it is possible that the locking device is provided with an actuating element, a transmission and a locking element, the locking element being connected to the actuating element through said transmission, said transmission converting a movement of the actuating element by the closing element into another movement of the locking element. Such embodiment would also be useful at the rear of the roof opening if the transmission converts a downward movement of the closing element into a substantially horizontal movement of the locking element. Unlocking should then be done in another way, for example electrically, or through the operating mechanism, as an upward movement op the closing element cannot be used to deactivate the locking element.

In an embodiment in which the locking device is used at the front of the roof opening, the locking element and the actuating element may be movable substantially parallel to the forward movement of the closing element, the transmission reversing the movement of the actuating element into a larger movement of the locking element.

In this manner, the small movement of the closing element is sufficient to create a larger movement of the locking element so as to obtain a reliable lock of the closing element.

In one embodiment, the transmission includes a lever arrangement, wherein the actuating element is connected to a first lever arm and the locking element is connected to a second lever arm that is longer than the first lever arm.

In this way it is possible to simply create a sufficiently large transmission ratio.

In another embodiment, the locking device is shaped and movable to allow entrance of the retaining hook when moving downwardly and forwardly to the closed position, but to prevent a vertical upward movement of the retaining hook in the closed position of the closing element.

In this embodiment, the locking effect is created by carefully designing the locking device and retaining hook in dependence of the movement of the closing element, such that a particular movement with a horizontal component (or a component parallel to guide rails) is allowed, but a movement without such component is prevented.

One way of obtaining this is by an embodiment in which the locking device is pivotable around a substantially horizontal transverse axis and is preferably provided with a short upper leg and a long lower leg, the retaining hook of the closing element being shaped to hook below the upper leg and to engage the lower leg at a distance beyond the length of the upper leg, the locking device being slightly pivoted when the retaining hook enters the locking device.

Thus the engagement between the longer leg and the retaining hook prevents movement of the shorter leg when the retaining hook is moved upwardly, because movement of the longer leg is hindered by the retaining hook, which in turn is hindered by the shorter leg which moves less than the longer leg.

In a simple embodiment, the upper and lower legs extend substantially parallel at a distance sufficient to allow the retaining hook to enter the space between the upper and lower legs.

To improve the reliability of the locking device, the locking device comprises a spring biasing the locking device to its unlocking position. In this way, the locking device will always be in the unlocking position when the retaining hook arrives at the locking device.

In another embodiment, the locking device is an electrically actuated locking device, such as an electromagnetic lock having a locking latch configured to move and engage the retaining hook, the electromagnetic lock having an actuating button which can be actuated by any part of the closing element.

This embodiment is very versatile as the actuating button can be placed anywhere to cooperate with a part connected to the closing element, because there is no requirement for a mechanical connection.

Nonetheless, the retaining hook may be configured to actuate the actuating button of the electromagnetic lock, so that the locking device can be a single unit.

In a further embodiment, the retaining hook is positioned at the rear of the closing element, and the electromagnetic locking device being positioned at the rear of the roof opening.

Aspects of the invention also include a vehicle having the roof assembly as described above.

BRIEF DESCRIPTION OF THE DRAWINGS

Further details and advantages follow from the below description of the accompanying drawings showing embodiments of the roof assembly by way of example.

FIGS. 11a-11d (collectively referred to as FIG. 11) are perspective views of the locking device and retaining hook in four different positions close to the closed position of the closing element.

DETAILED DESCRIPTION OF THE ILLUSTRATIVE EMBODIMENTS

Figure 1:
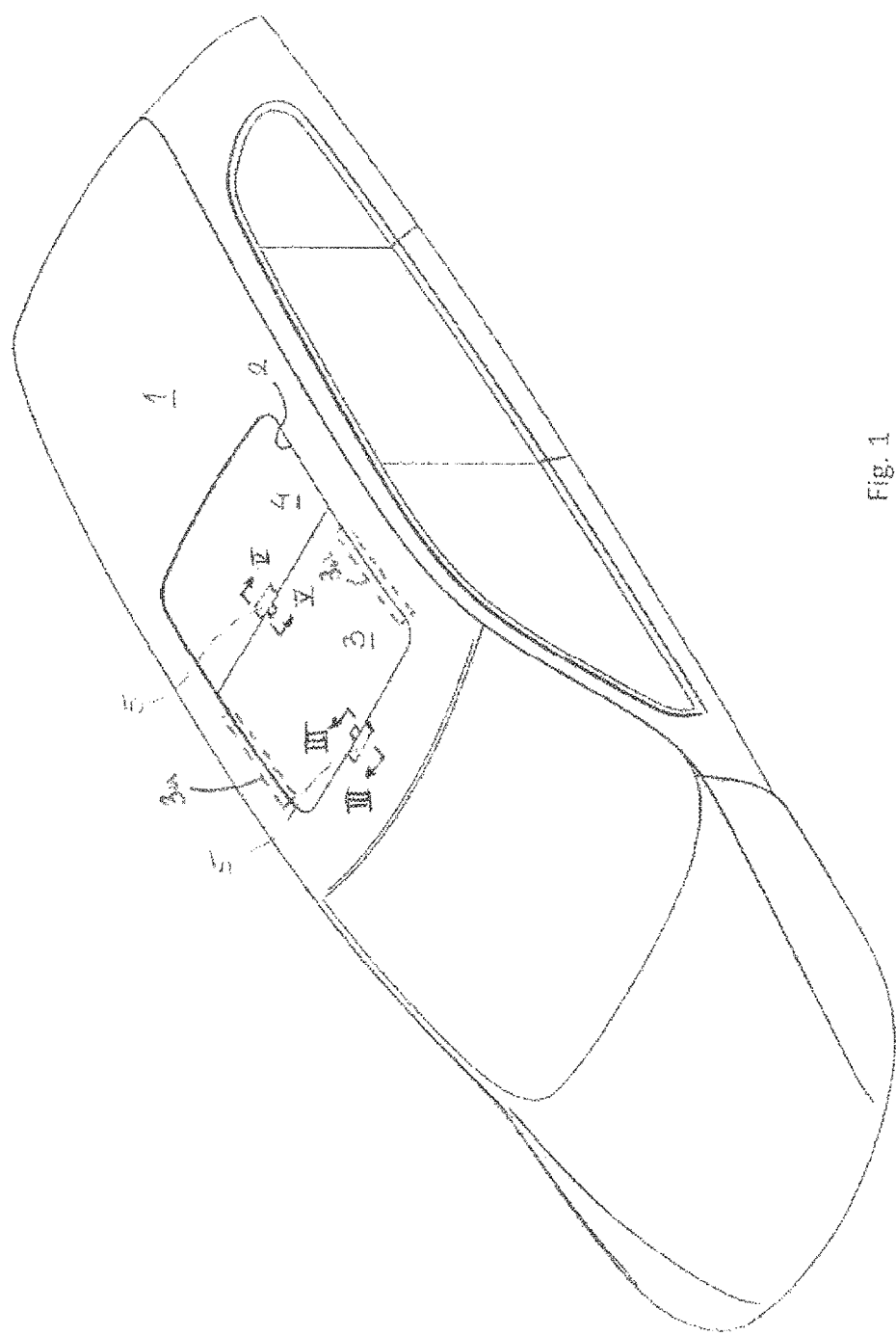
FIG. 1 is a schematic perspective view of a part of a vehicle having an embodiment of the roof assembly of the invention.

The drawing, and in the first instance FIG. 1, shows a vehicle, such as a passenger car or utility vehicle, comprising a fixed roof portion 1, in which a roof opening 2 has been formed for the purpose of accommodating a roof assembly. The fixed roof portion 1 may be part of the vehicle or part of the roof assembly and replacing the normal roof of the vehicle. In this embodiment the roof assembly comprises a first closing element 3 and a second closing element 4 which may both be in the form of a rigid panel, which may or may not be transparent, and which together close the roof opening 2 in their closed position and which can be opened from said closed position. The first closing element or panel 3 can in any case be opened by moving the rear side of the panel 3 upwardly and sliding the panel rearwardly over the second panel 4. The second closing element 4 may also be comprised of a foldable cover, slats or the like, or may be a fixed panel, or just form part of the fixed roof portion 1. An operating mechanism schematically illustrated at 3a on each side of the closing element 3 includes commonly cable operated slide mechanisms on guides with lift mechanisms to raise and lower the closing element 3. In particular, the slide and lift mechanisms include slides and/or levers to effectuate a downward and slightly forward movement of the closing element 3 to the closed position. Such operating mechanisms 3a are well known in the art.

Figure 2:
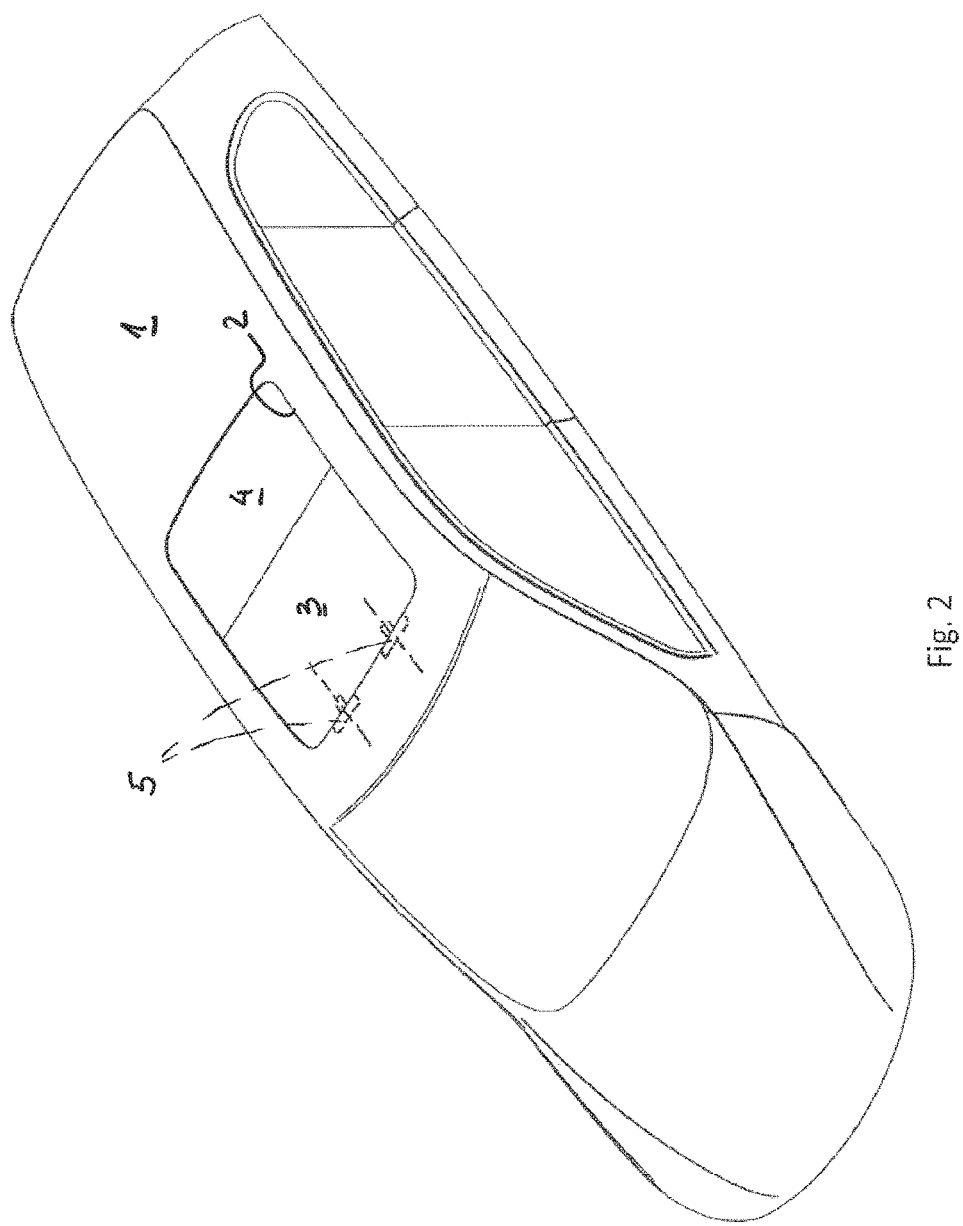
FIG. 2 is a view corresponding to that of FIG. 1 but showing a different embodiment of the roof assembly having differently placed locking devices.

As mentioned, the roof opening 2, in this case extending longitudinally between the fixed roof portion 1 and the fixed second panel 4, can be exposed to a large extent by the first panel 3. When the panel 3 is closed it will be moved from a venting position, in which its rear side is up, downwardly, and the last movement to the closed position will be both downward and slightly forward. At least on the front side, but in this case also on the rear side, of the roof opening 2 there is provided a locking device 5 attached to the fixed roof portion 1 or to a stationary roof part, such as a frame 6 to support the closing elements and to fix the roof assembly to the fixed roof portion 1. In the embodiment shown, the locking device 5 is positioned in the centre of the front and rear side of the roof opening 2. FIG. 2 shows a variation in which two locking devices 5 are distributed along the front side of the roof opening 2. Other positions and numbers of locking devices 5 are conceivable.

The locking devices 5 are configured to cooperate with a retaining hook 7 fixed to the panel 3. The function of the locking device is to prevent unwanted upward movements of the panel 3 which may be caused by low pressures above the panel 3 when the vehicle is driving at very high speeds, for example more than 300 km/h.

Figure 3:
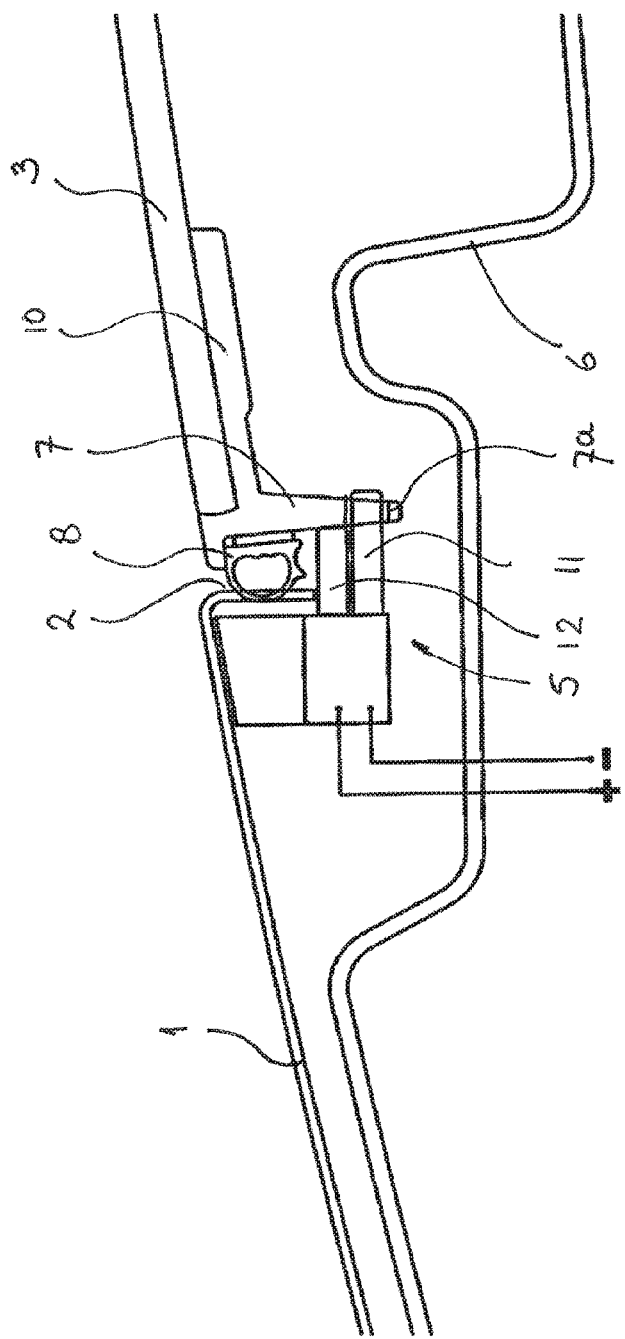
FIG. 3 is a very schematic cross-sectional view according to the line III-III in FIG. 1 and showing a locking device at the front of the roof opening.
Figure 4:
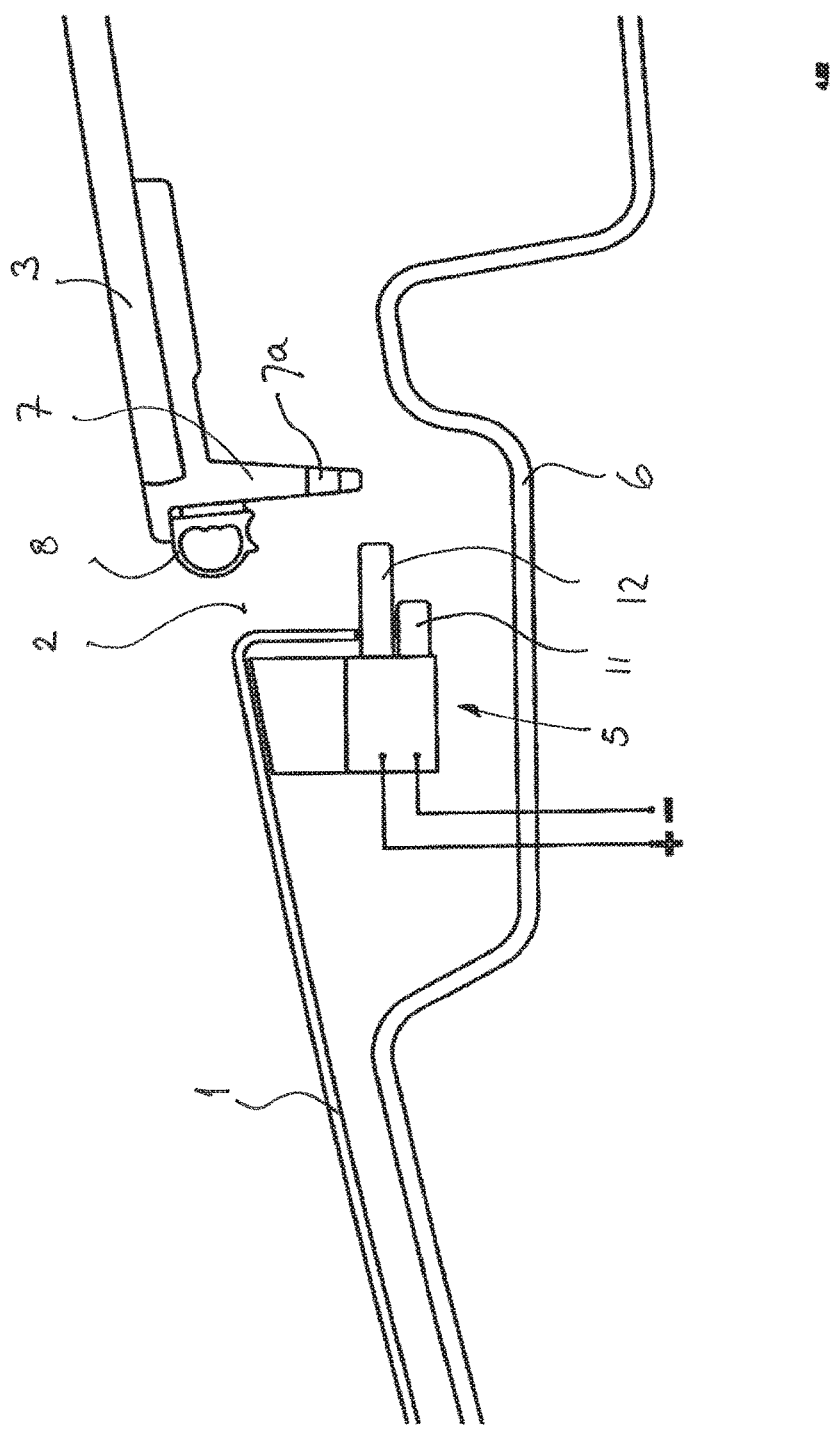
FIG. 4 is a view corresponding to that of FIG. 3, but showing the closing element close to its closed position.

FIGS. 3 and 4 show a first embodiment of the roof assembly. There are shown the fixed roof 1, the panel 3 carrying the retaining hook 7 and the locking device 5 fixed on the frame 6, or to the fixed roof 1. Also shown is a seal 8 on the outer edge of the panel 3 cooperating with the edge of the roof opening 2. The retaining hook 7 comprises a hole 7a in a metal reinforcement frame 9 (not shown here, see FIG. 7) of the panel Sand in encapsulating material 10 used to fix the reinforcement 9 to the glass of the panel 3.

The locking device 5 is provided with a locking element in the form of a locking pin 11 capable of entering the hole 7a of the retaining hook 7. The locking pin 11 is movable back and forth in a substantially horizontal direction, or better substantially parallel to the fixed roof 1 or panel 3 or any guiderails at this location (there will normally be a curve in these parts). The movement of the locking pin 11 is electrically controlled, such as by an electromagnet, servomotor or the like. This locking device 5 is actuated by the panel 3 arriving near its closed position, here by means of a proximity switch such as an actuating or push pin or button 12. This proximity switch 12 is engaged by the retaining hook 7 or another part of the panel 3. Only a small movement of the panel 3 in horizontal direction (or a component of the movement in horizontal direction) is needed to actuate the locking device 5 so as to electrically move the locking pin 11 from the unlocking position to the locking position in which it is in engagement with surface(s)

of the hole 7a of the retaining hook 7. A reverse movement of the locking pin 11 is effected when the panel 3 is moved again from the closed position towards the open position.

Figure 5:
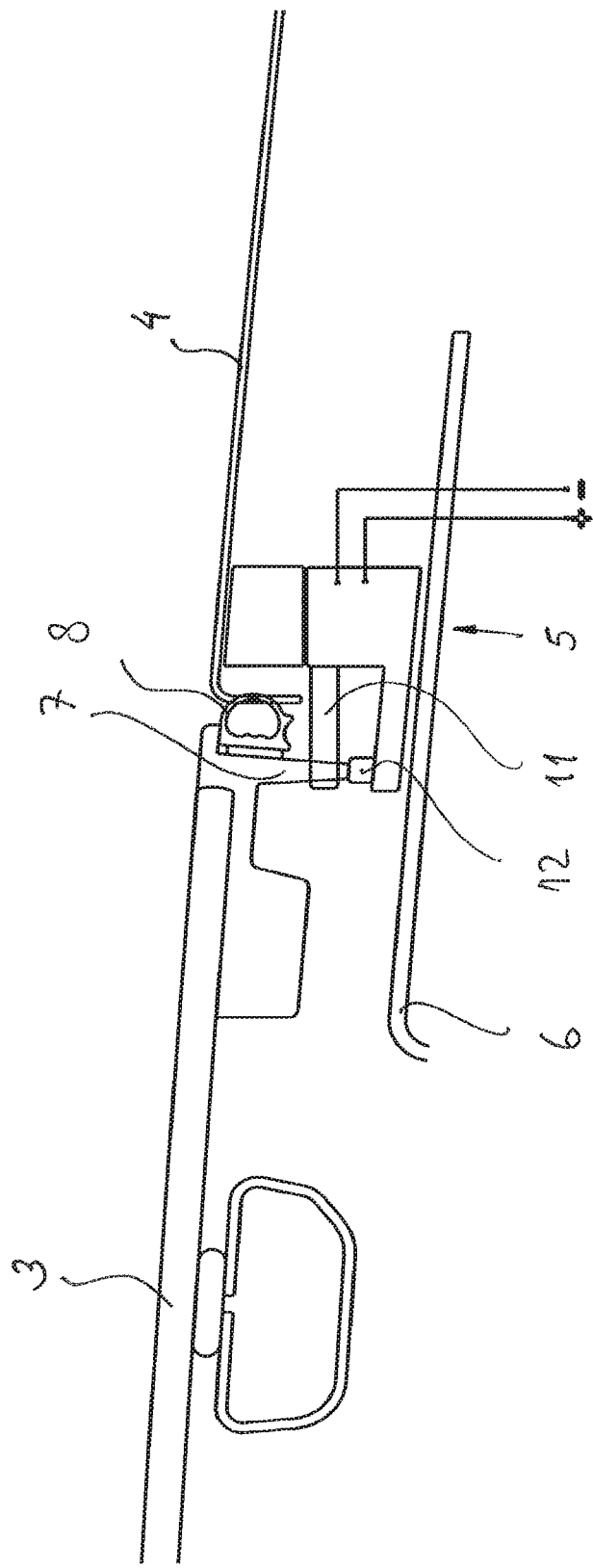
FIG. 5 is a very schematic cross-sectional view according to the line V-V in FIG. 1, showing a locking device at the rear of the roof opening.
Figure 6:
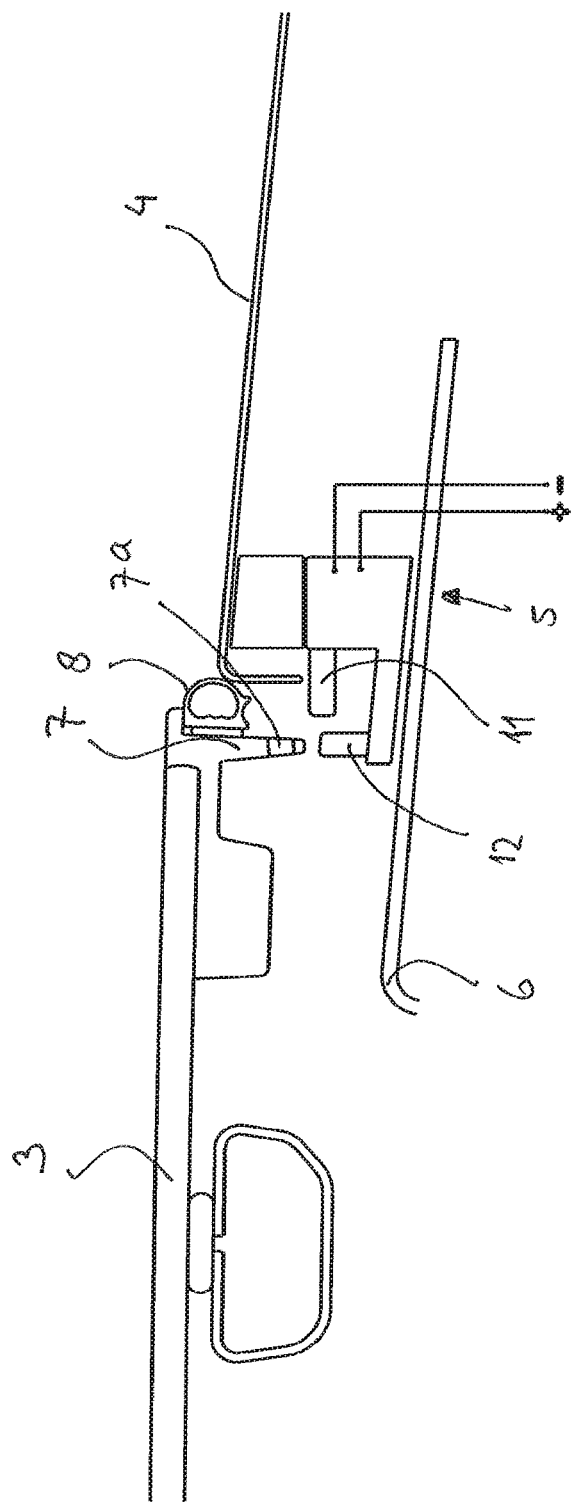
FIG. 6 is a view corresponding to that of FIG. 5, but showing the closing element close to its closed position.

FIG. 5 shows a second locking device 5 which is positioned at the rear side of the roof opening, here at the front side of the second (fixed) panel 4. This locking device 5 is similar to that on the front side except for the proximity switch 12 which is extending and movable in substantially vertical direction. The locking pin 11 of this rear locking device is actuated by the proximity switch 12 which is controlled by a vertical movement of the panel 3 at its rear side, i.e. by engagement with the lower end of the retaining hook 7 or another part of the panel 3. This proximity switch 12 of the rear locking device 5 could also be used to activate the front locking device. Unlocking of the locking device 5 should be done electrically without involvement of the proximity switch 12, because upward movement of the retaining hook 7 cannot be used for unlocking. Then, this is the movement that should be prevented by the locking device. A signal should thus be sent to the locking device 5 to unlock, for example by activation of the operating button, before the rear side of the panel 3 can be moved upwardly.

Figure 7:
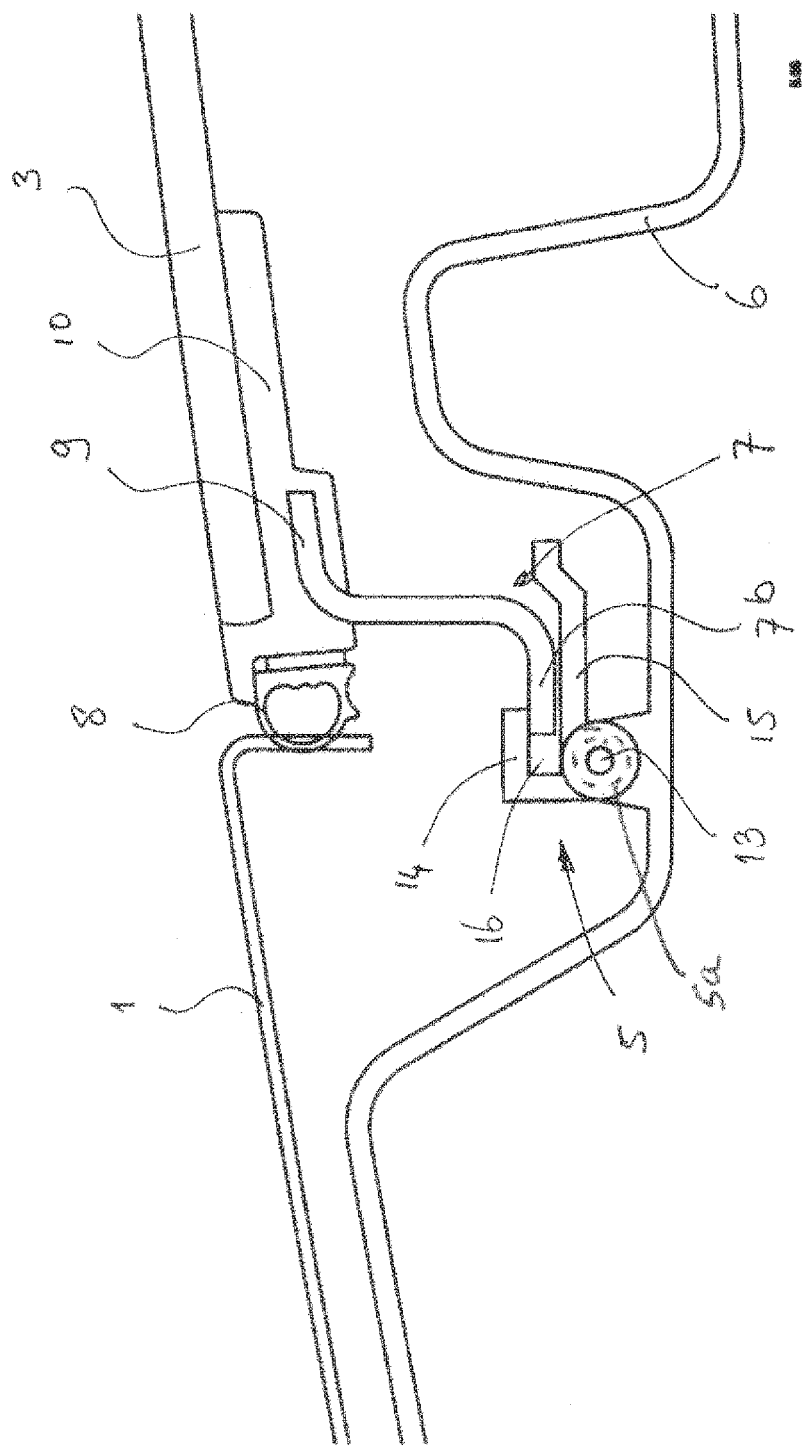
FIG. 7 is a view corresponding to that of FIG. 3 but showing a further embodiment of the roof assembly.
Figure 8:
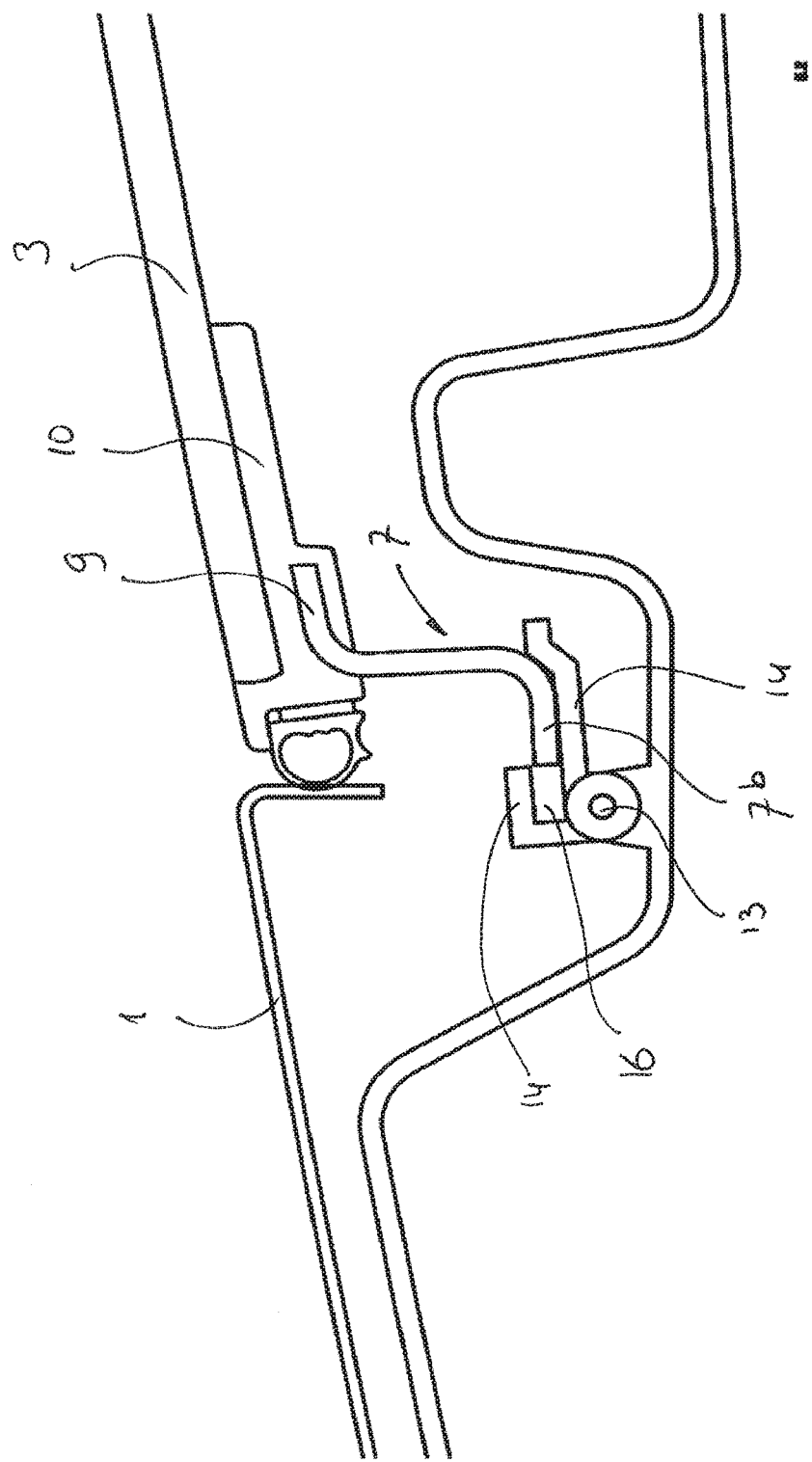
FIGS. 8 and 9 are views corresponding to that of FIG. 7, but showing two other positions of the closing element and locking device.
Figure 9:
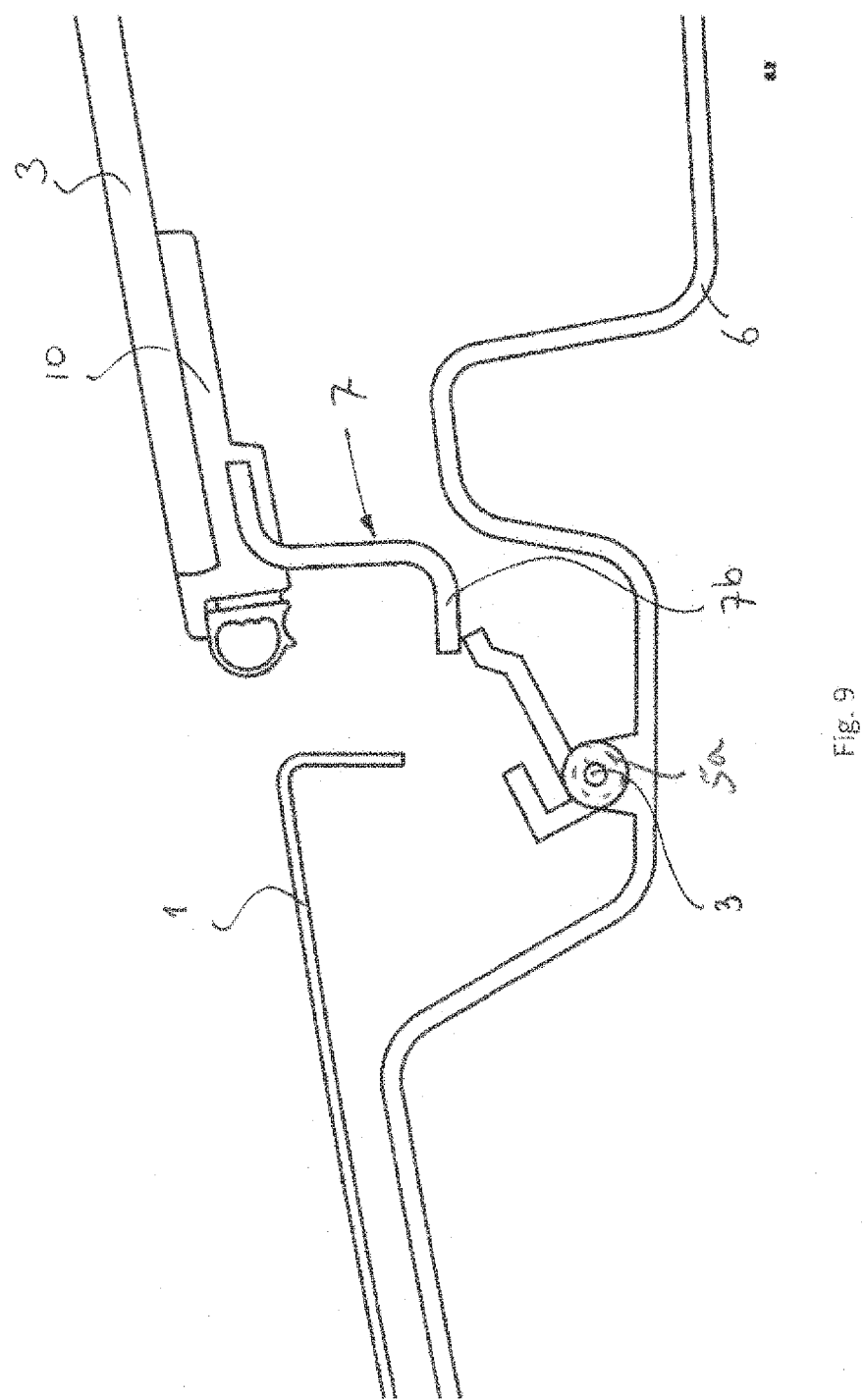

FIGS. 7-9 show another embodiment of the roof assembly. The retaining hook 7 is now formed with a flange 7b at the bottom of the reinforcement frame 9, which flange 7b extends substantially horizontally, or better substantially parallel to the upper side of the panel 3 at this location, and towards the front of the roof assembly. The locking device 5 is operating mechanically now and is pivotable around a substantially horizontal transverse axis 13. The locking device 5 includes a short upper leg 14 and a longer lower leg 15. The legs 14 and 15 are spaced at a distance so as to create a space 16 such that the flange 7b of the retaining hook 7 can enter the space 16 between the legs 14, 15. The locking device 5 comprises a spring schematically indicated at 5a, herein illustrated as a torsion spring (not shown) configured to bias (e.g. to pivot) the locking device 5 to its unlocking position, here such that the legs 14, 15 extend slightly upwardly in rearward direction (FIG. 9). Of course, the spring can take other forms such as but not limited to spring(s) operable in tension or compression.

As FIG. 9 shows, the flange 7b approaches the locking device 5 which is positioned in its unlocking position. In FIG. 8, the flange 7b enters the space 16 between the legs 14, 15 in its downward and forward movement with the panel 3. It comes into engagement with the lower leg 15 of the locking device. Upon further movement of the panel 3 and flange 7b towards the closed position of the panel 3, the flange 7b enters the space 16 to a greater extent and pushes the leg 15 downwardly, so that the locking device 5 is pivoted to its locking position, as shown in FIG. 7. In this locking position, the engagement between the longer lower leg 15 and the flange 7b of the retaining hook 7 at a position beyond the upper leg 14 prevents movement of the shorter leg 14 when the retaining hook 7 is moved upwardly, because movement of the lower leg 15 is hindered by the flange 7b, which in turn is hindered by the upper leg 14 which moves less than the lower leg 15. Moving the panel 3 towards its open position is possible, as the combined rearward and upward movement and/or tilting of the flange 7b can be followed by the locking device 5 when it moves back to its unlocking position.

Of course, the retaining hook 7 may be shaped differently, and especially the part engaging the lower leg 15 may also be a part separate from the flange 7b of the retaining hook 7. The legs 14, 15 do not have to extend parallel, and especially the lower leg 15 may have all kind of shapes, as only the position where it engages the flange 7b or other part is important.

Figure 10:
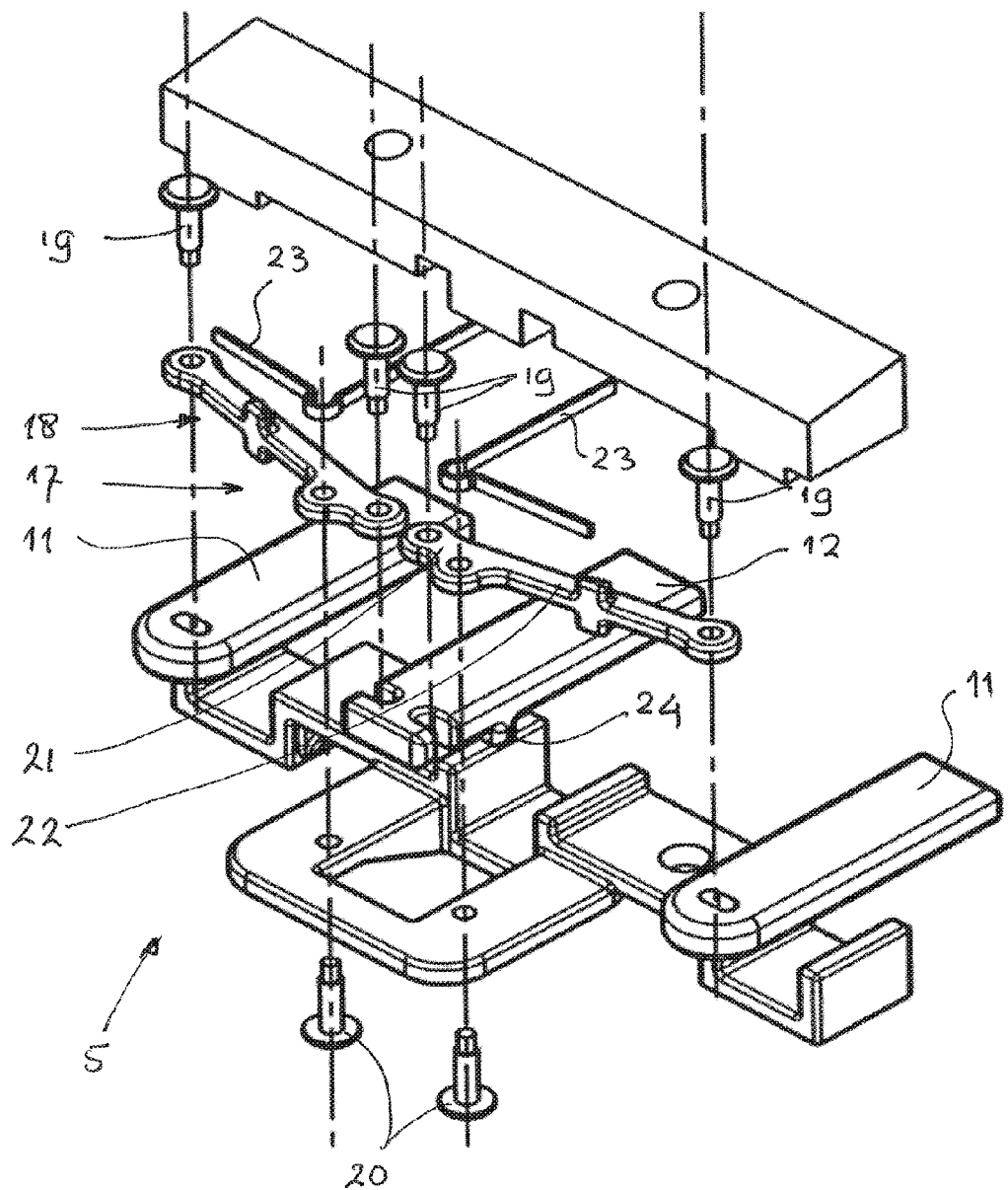
FIG. 10 is an exploded view of another embodiment of a locking device for the roof assembly.

FIGS. 10, 11 show another embodiment of the roof assembly having a locking device 5 at the front side of the roof opening 2. The locking device 5 comprises one proximity switch, such as an actuating element or push button 12 and a locking element in the form of two locking pins 11. The proximity switch 12 and locking pins 11 are connected to each other through a transmission 17 such that a linear movement of the proximity switch 12 is reversed and enlarged into a larger linear movement of the locking pins 11 in an opposite direction. The transmission 17 comprises a lever 18 for each locking pin 11. The levers 18 are pivotally and slidably connected to the push button 12 and locking pins 11, and between these pivot points 19, the levers have a fixed third pivot axis 20 so as to create a short lever arm 21 next to the push button 12 and a long lever arm 22 next to the locking pins 11. Torsion springs 23 bias the levers to the unlocking position in which the locking pins 11 are retracted and the push button 12 in its outer position. A stop 24 determines the outer position of the push button 12. Parts mounted on the frame 6 guide the actuating and locking elements.

Figure 11C:
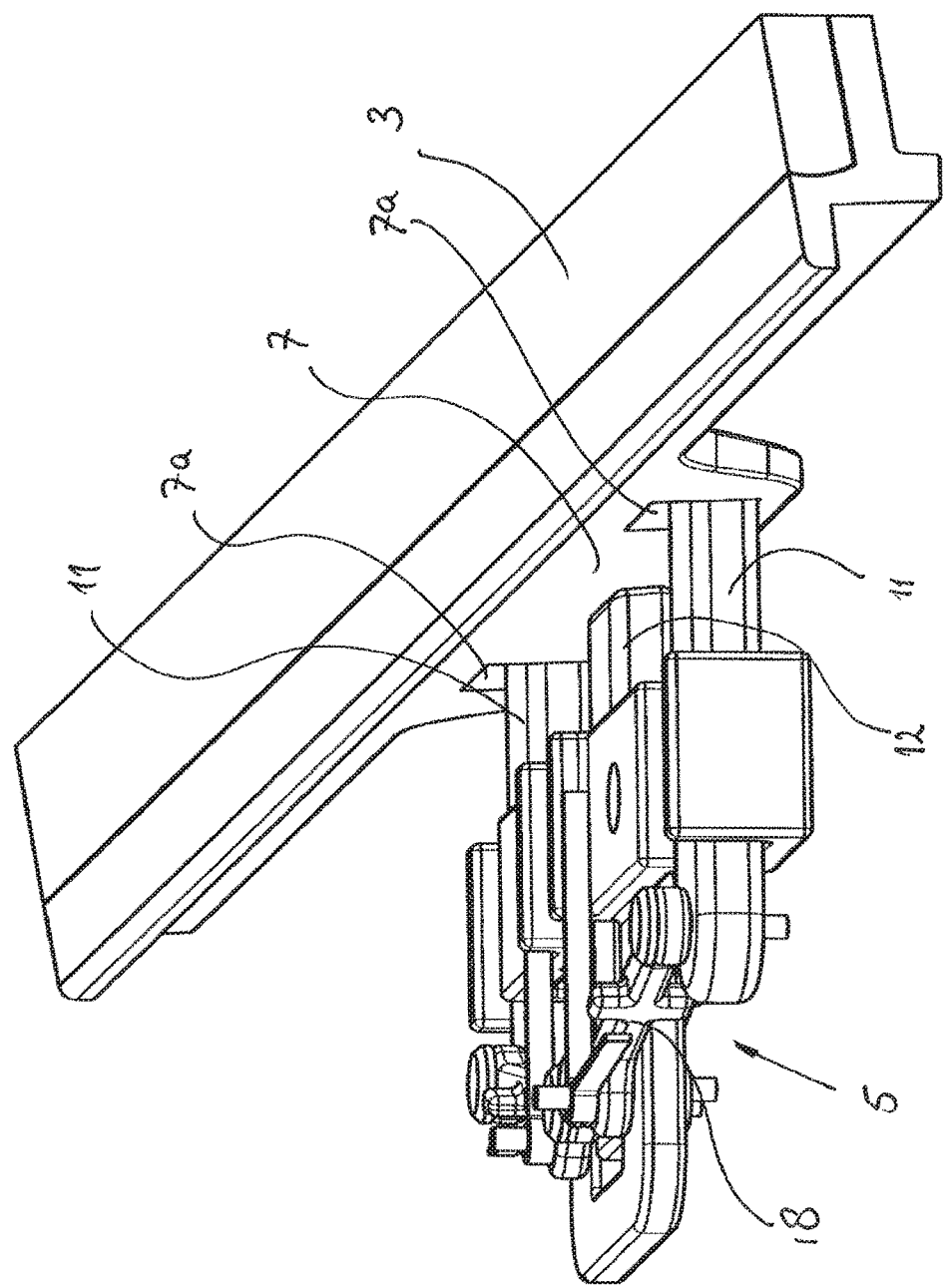
Figure 11D:
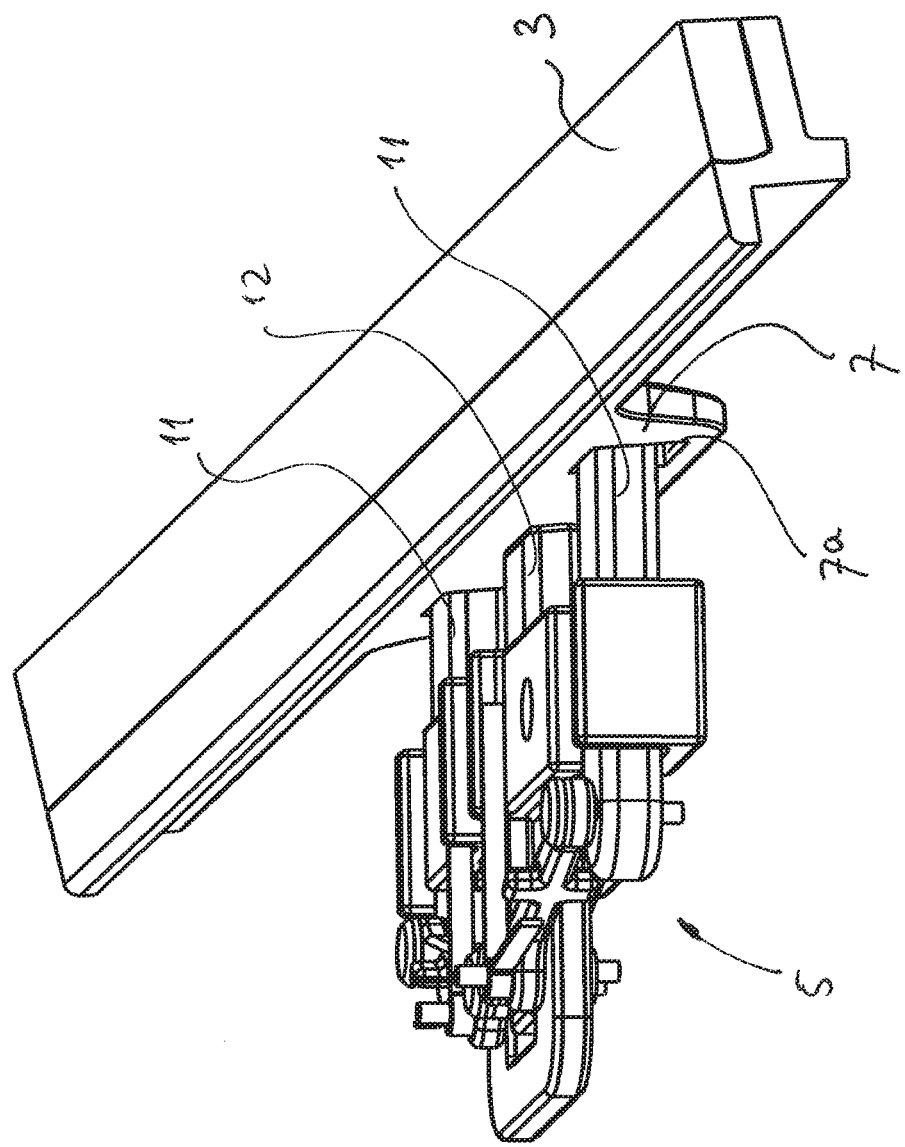

FIGS. 110a-11d illustrate the operation of this embodiment of the locking device 5.

FIG. 11a shows the panel 3 approaching the closed position. The retaining hook 7 here comprises two holes 7a, one for each locking pin 11. The push button 12 extends slightly beyond the locking pins 11.

In FIG. 11b the retaining hook 7 comes into contact with the push button 12 before the locking pins 11 enter the holes 7a of the retaining hook 7.

In FIG. 11c the retaining hook 7 has pushed the push button 12 a distance inwardly and this inward movement of the push button is converted by the levers 18 into a lager outward movement of the locking pins 11 so that they enter into the holes 7a with a greater speed than the retaining hook 7 moves forwardly. In FIG. 11c the panel 3 has reached its forward position and the locking pins 11 have moved fully into the holes 7a. The lower side of the holes 7a are in engagement with the lower side of the locking pins 11. The locking pins 11 fit loosely in the holes 7a as there is room in the holes 7a above the locking pins 11. The pins 11 are guided securely so that an upward force on the part of the locking pins 11 projecting into the holes 7a does not affect an upward movement of the locking pins 11.

FIG. 11d show the panel front and the retaining hook 7 in an upwardly tilted venting position. The panel 3 and thus the retaining hook 7 has slightly moved in vertical direction (downwardly) when the panel 3 is moved from its closed position, but this is allowed by the holes 7a having a larger height than the locking pins 11.

From the foregoing it will be apparent that the invention provides an roof assembly and a vehicle fitted therewith, by means of which undesirable upward movements of the panel in its closed position is prevented in an effective manner.

The invention is not limited to the above-described embodiment as shown in the drawing, which can be varied in several ways within the scope of the invention.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. A roof assembly for a vehicle having a roof opening in a fixed roof portion, comprising:
   a stationary part configured to attach the roof assembly to the fixed roof portion;
   at least one closing element movably supported by the stationary part and configured to move between a closed position to close the roof opening and an open position in which a rear of the closing element is raised and the closing element is moved rearwardly;
   an operating mechanism to move the closing element between the open and closed position, the operating mechanism being configured to move the closing element to the closed position with a downward and slightly forward movement;
   a locking device on the stationary part, the locking device movable between a locking position and an unlocking position, the locking device being pivotable around a substantially horizontal transverse axis, the closing element being configured to actuate the locking device to move from the unlocking position to the locking position when the closing element is moved to the closed position; and
   at least a retaining hook configured to hook below the locking device on the stationary part in the closed position of the closing element to provide a mechanical lock for the closing element in an upward direction, the retaining hook being positioned at a front of the closing element, and the locking device being positioned at a front of the roof opening,
   wherein the locking device is shaped and movable to allow entrance of the retaining hook when moving downwardly and forwardly to the closed position, but to prevent a vertical upward movement of the retaining hook in the closed position of the closing element.

2. The roof assembly of claim 1, wherein the locking device is provided with an upper and a lower leg, the upper and lower legs extending substantially parallel in a direction towards the retaining hook when the closing element approaches the closed position and at a distance sufficient to allow the retaining hook to enter a space between the upper and lower legs.

3. The roof assembly of claim 1, wherein the locking device comprises a spring configured to bias the locking device to the unlocking position.

4. The roof assembly of claim 1, wherein a plurality of locking devices is distributed along a side of the roof opening.

5. A vehicle comprising:
   a fixed roof portion having a roof opening;
   a roof assembly to open and close the roof opening, the roof assembly comprising:
   a stationary part configured to attach the roof assembly to the fixed roof portion;
   at least one closing element configured as a rigid panel movably supported by the stationary part and configured to move between a closed position to close the roof opening and an open position in which a rear of the closing element is raised and the closing element is moved rearwardly;
   a locking device positioned at a front of the roof opening on the stationary part, the locking device being pivotable around a substantially horizontal transverse axis between a locking position and an unlocking position, the closing element being configured to actuate the locking device to move from the unlocking position to the locking position when the closing element is moved to the closed position; and
   at least a retaining hook positioned at a front of the closing element and configured to hook below the locking device on the stationary part in the closed position of the closing element to provide a mechanical lock for the closing element in a vertical direction,
   wherein the locking device is shaped and movable to allow entrance of the retaining hook when moving downwardly and forwardly to the closed position, but to prevent a vertical upward movement of the retaining hook in the closed position of the closing element.

6. The vehicle of claim 5, wherein the locking device is provided with an upper and a lower leg, the upper and lower legs extending substantially parallel in a direction towards the retaining hook when the closing element approaches the closed position and at a distance sufficient to allow the retaining hook to enter a space between the upper and lower legs.

7. The vehicle of claim 5, wherein the locking device comprises a spring configured to bias the locking device to the unlocking position.

8. The vehicle of claim 5, wherein a plurality of locking devices is distributed along a side of the roof opening.

* * * * *